No. 790,072.　　　　　　　　　　　　　　　　　　　　　　　Patented May 16, 1905.

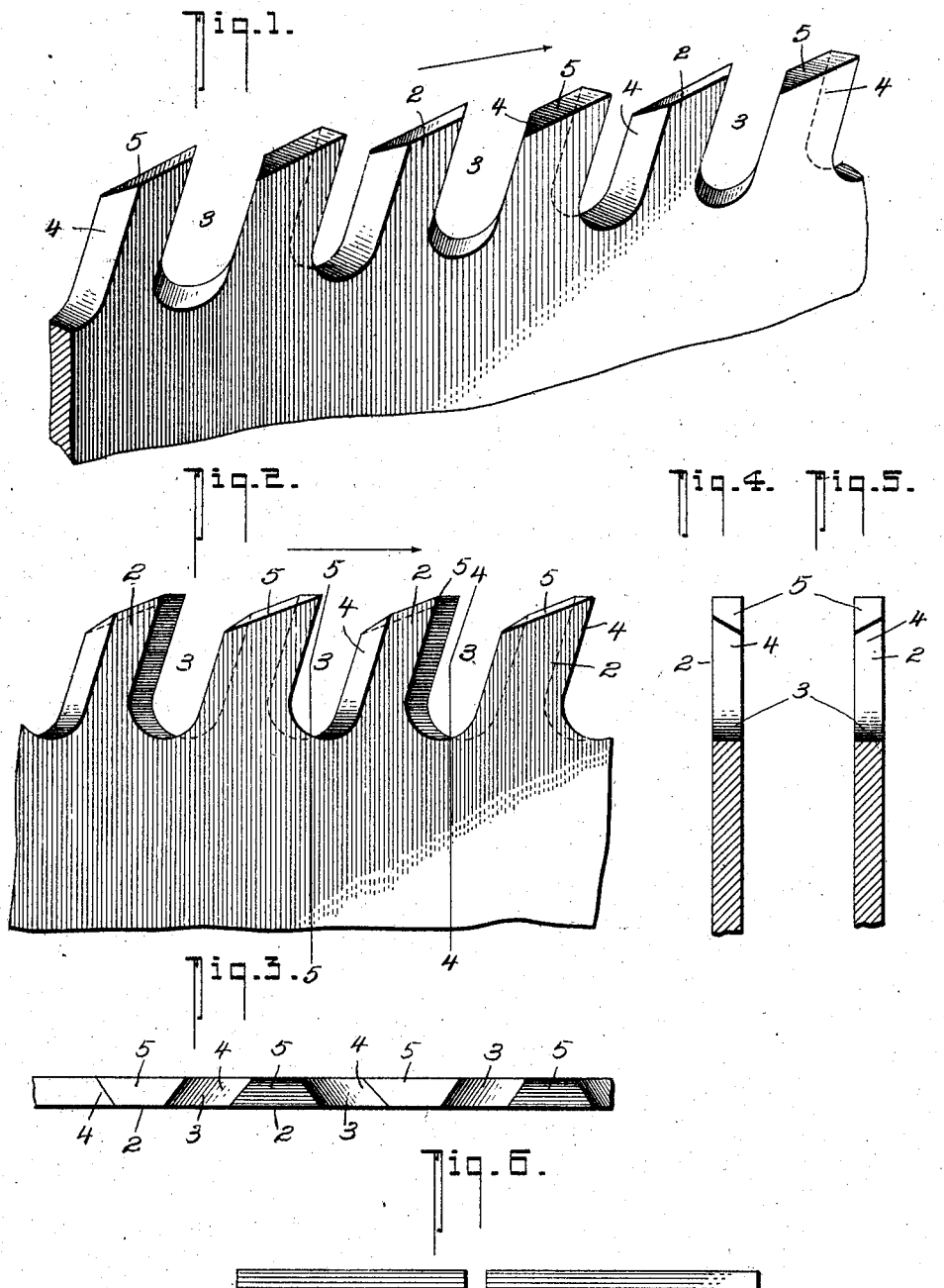

UNITED STATES PATENT OFFICE.

JOHN H. McLEAN, OF VANCOUVER, CANADA.

SAW-TOOTH.

SPECIFICATION forming part of Letters Patent No. 790,072, dated May 16, 1905.

Application filed November 3, 1904. Serial No. 231,215.

*To all whom it may concern:*

Be it known that I, JOHN H. McLEAN, a citizen of the Dominion of Canada, residing at Vancouver, in the Province of British Columbia, Canada, have invented new and useful Improvements in Saw-Teeth, of which the following is a specification.

My invention relates to an improved saw-tooth designed especially as what is locally known in the trade as a "mitering-saw," but is equally applicable to the general purposes of ripping and cross-cutting, as the form of its teeth is well fitted to perform either work.

In designing saw-teeth the error is commonly made of endeavoring to cut the grain of the wood on each side of the saw thickness by providing the teeth with acute chisel edges, ground alternately to the opposite sides of the saw-blade; but to attain these acute cutting edges the material of the tooth is ground away toward the point, so that it is impossible to provide a cutting edge across the thickness of the tooth to remove the wood between the two side cuts. The teeth therefore merely roll and tear this material out instead of cutting it clear away and throwing it into the gullet. This rolling action causes considerable waste of power and rapidly heats the saw. This construction of tooth is also open to the objection that the acute edge is quickly dulled, and the points of the teeth being insufficiently backed up with metal are subject to serious damage if they encounter a hard obstacle during the cut.

The tooth which I have invented and which is the subject of this application is carefully designed to avoid these faults, as the tops of the teeth cut across the entire gage thickness of the saw and the material is removed at once into the gullet. As a result, a saw the teeth of which are shaped and ground in accordance with my instructions is susceptible of a high rate of feed, will last much longer without the cutting edges of the teeth becoming dull, and the points of the teeth are well backed up with metal, so they are not liable to such extensive injury when they meet with an obstacle in their cut. As evidence that the work of removal of the saw-cut is better performed, the saw, although made with very little or no set, does not heat, and the cut is clean and smooth. The particular manner in which these teeth are formed is fully described in the following specification and illustrated in the drawings which accompany it.

Figure 1 is a perspective view of a portion of the saw, showing a series of teeth. Fig. 2 is a side elevation thereof. Fig. 3 is a plan view thereof. Figs. 4 and 5 are sections taken, respectively, on the lines 4 4 and 5 5 of Fig. 2. Fig. 6 represents a piece of wood having a saw-cut across it for mitering purposes.

In the drawings the teeth are represented by 2, and the gullets 3 between them are cut so as to afford a slight hook to the cutting-face of the tooth and to leave the body of the tooth parallel in profile, as shown in Fig. 1. The adjacent gullets are reversely inclined, so as to give a moderate bevel to the front cutting-face 4 of the teeth of about forty-five degrees from the face of the body of the saw. The tops 5 of the teeth are ground with a moderate downward slope backward from the extreme outward edge of the face 4 or tip of the tooth, the amount of rake from back to front being about equal to the gage thickness of the saw, and the plane of grinding of this top is also sloped slightly downward to the cutting-face side of each tooth. This lateral downward slope toward the cutting-face side of each tooth is designed to make the extreme top of the cutting edge square in end elevation to the face of the blade, (see Fig. 3,) as without it the intersection of the two inclines—that of the cutting-face and the backward slope or rake of the top of the tooth—would be inclined downward from the cutting-face side of each tooth. The incline of this intersection is corrected in the manner described, and the cutting edge of the points of the teeth are brought square across the thickness of the saw, because for general purposes it is desirable that the bottom of the saw-cut shall be square to the sides. Teeth so formed and ground will be found to be much cheaper to cut in the first instance and simpler to maintain, besides giving a much greater efficiency in the work performed, and will leave a cleaner and smoother cut surface. The hook of the gap 3 enables a sufficiently acute angle to be obtained at the point of the tooth, with a moderate backward slope of the top 5, which moderate slope, combined with the moderate angle of the bevel of the cutting-face, enables a cutting edge to be obtained at the point of the tooth across the whole width of the saw-cut, so that each tooth not only cuts its way, but at once removes the material of its cut into the gullet, and no necessity is experienced for introducing a drag-tooth to perform this duty, as is common with saws designed for such work, and the slight slope toward the cutting-face side of each tooth brings the cutting edge of the tip of the tooth square to the face of the saw-blade.

Having now particularly described my invention and the manner of its operation, I hereby declare that what I claim as new, and desire to be protected in by Letters Patent, is—

1. A saw comprising uniformly-constructed teeth the sides of each tooth being parallel to one another in profile and the front cutting-faces of the teeth moderately hooked or undercut and ground to moderately-acute alternately-reversed angles to the face of the saw-blade, the bottoms of the gullets semicircular and horizontally straight across the blade thickness, the tops of the teeth sloped downward moderately from the front face and the plane of grinding sloping alternately in adjacent teeth downward toward the cutting-edge side of each.

2. A saw, comprising uniformly-constructed teeth, the side faces of each being flat and the side faces of each tooth being parallel with each other, the thickness faces of each tooth being ground to moderately-acute and opposite angles reversed on adjacent teeth to form U-shaped passages between adjacent teeth, and extending at an angle to the faces of the saw, the adjacent thickness faces of adjacent teeth being parallel to each other, the bottom of the passages being semicircular and extending horizontally across the saw, the passages between adjacent alternating pairs of teeth being disposed at opposite equal angles to the plane of the saw-body, the tops of the teeth sloped downwardly moderately from the front face and the plane of grinding sloping alternately in adjacent teeth downward toward the cutting-edge side of each, substantially as shown and described.

In testimony whereof I have signed my name to this specification in the presence of two subscribing witnesses.

JOHN H. McLEAN.

Witnesses:
 ROWLAND BRITTAIN,
 M. BRITTAIN.